July 2, 1929.  E. B. CHISHOLM  1,719,100

POULTRY DRINKING FOUNTAIN

Filed Sept. 22, 1927

Inventor

E. B. Chisholm,

By Clarence A. O'Brien
Attorney

Patented July 2, 1929.

1,719,100

UNITED STATES PATENT OFFICE.

EUGENE B. CHISHOLM, OF BRADY, TEXAS.

POULTRY DRINKING FOUNTAIN.

Application filed September 22, 1927. Serial No. 221,324.

One object of my said invention is the provision of a simple and durable drinking fountain for poultry, designed more especially for use in the winter time, and also designed with a view to averting freezing of the water and also wetting of the wattles of poultry.

Another object of the invention is the provision of a drinking fountain characterized as stated and having certain of its parts readily removable to adapt the device for use as a mere drinking pan in the summer time.

Another object is the provision of a drinking fountain having a top or crown member equipped in such manner as to discourage poultry perching upon the same.

Another object is the provision of a drinking fountain designed more especially for use in the winter time and constructed in such manner that it may be heated either through the medium of an electrical heating device or any ordinary coal oil lamp or other appropriate heating device.

To the attainment of the foregoing the invention consists in the improvement as hereinafter described and definitely claimed.

In the accompanying drawings, forming part of this specification:—

The tank 1 of my novel fountain may be, and preferably is formed of appropriate metal, and is preferably though not necessarily rectangular in outline. The said tank 1 has a bottom and side walls, and in one side wall of the tank is provided a filling opening 3 in communication with a receptacle 4, arranged exteriorly of the tank 1 and having a cover $4^a$, hingedly connected at $4^b$. The cover $4^a$ is raised for the charging of the tank with water through the receptacle $4^a$ and opening 3, but obviously the cover $4^a$ is closed after the filling operation with a view to retaining heat in the water in the tank. Opposite side walls of the tank 1 are provided with flanges $1^a$ and $1^b$ as clearly brought out in Figures 2 and 3.

Centrally arranged in the tank 1 and permanently fixed to the bottom wall thereof is an upright tubular casing 7 which is entirely open at its upper end and is also open at its lower end. At the latter end a portion of the tank bottom forms a circular inwardly directed flange $7^a$. The said flange $7^a$ is designed when a coal oil lamp or analogous heating device is employed in the tubular casing 7 to support the said lamp or analogous device.

Figure 2:
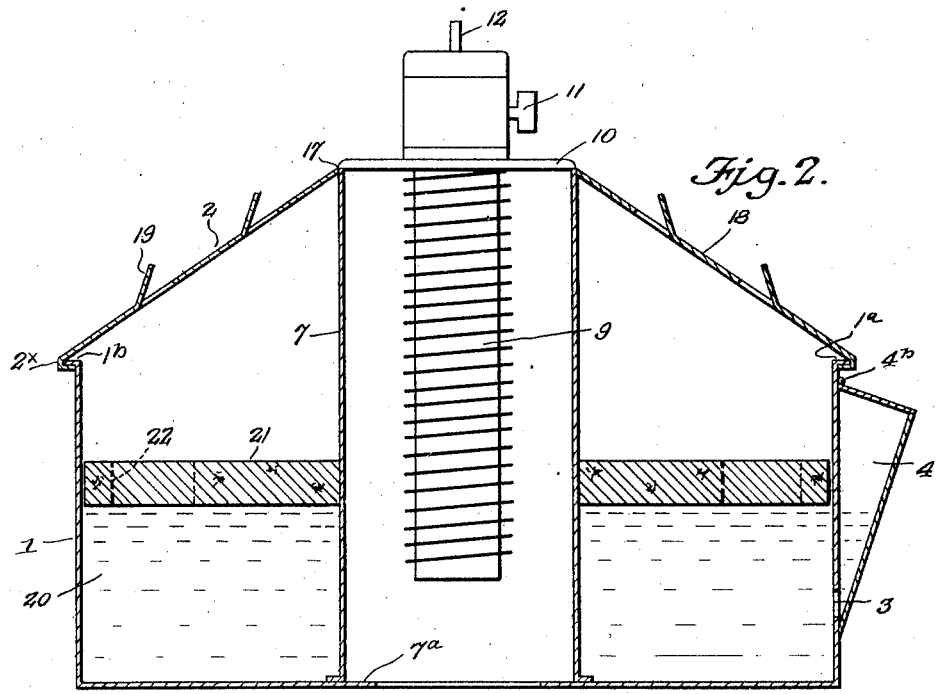
Figure 2 is a vertical section illustrating the fountain as it appears when an electrical heating device is employed in the said tubular casing.
Figure 3:
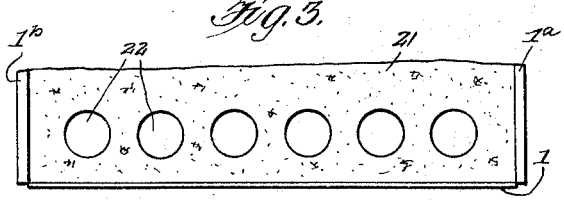
Figure 3 is a fragmentary plan view illustrating a portion of the apertured float in the tank.

In Figure 2 I show a heating element 9 of electric type in the casing 7, the said heating element being provided on its core with a flange 10, preferably of insulating material, which when the heating element is positioned in the tubular casing 7 is designed to bear on and close the upper end of the casing 7. The said heating element is provided with a conventional or other appropriate switch designated by 11, and is designed to be connected at 12 with any appropriate source of electric energy when such energy is available.

Figure 1:
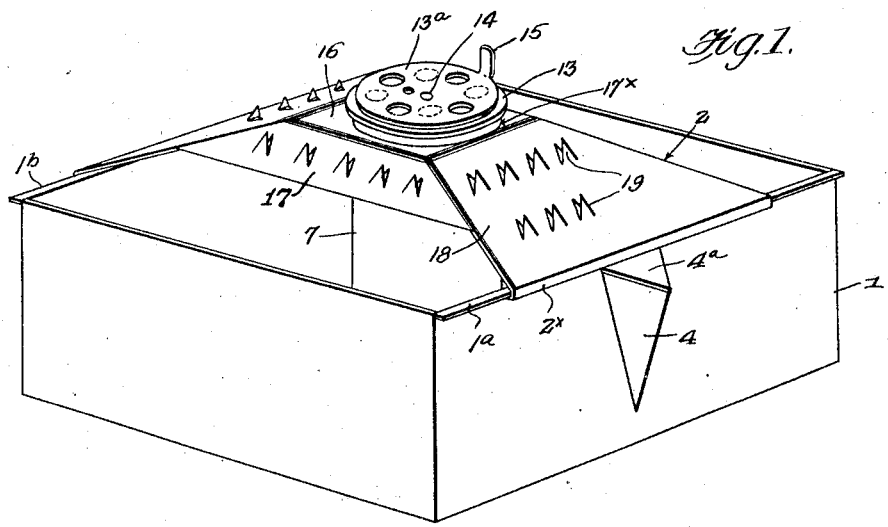
Figure 1 is a perspective of a drinking fountain constructed in accordance with my invention and showing the fountain as when a coal oil lamp is employed in the tubular casing of the device.

In Figure 1 the upper end of the tubular casing 7 is shown as closed by a removable plug-like cap with openings in its top wall, the said cap being designated by 13 and being equipped with an apertured disc-like damper 13, pivotally connected to the cap 1 as designated by 14, and equipped at or adjacent to its periphery with an upstanding finger piece 15. Manifestly by grasping said piece 15, the person in charge of the fountain may adjust the disc-like damper and thereby increase or diminish the size of the eduction openings of the tubular casing 7. It will also be obvious that when the coal oil heating lamp or other analogous heating device employed in the casing 7 is removed, and the cap 13 is also removed, an electrical heating element may be employed in the said casing 7 as shown in Figure 2.

An important part of my novel fountain is formed by the top or crown member designated by 2. The said top or crown member designated by 2 is preferably formed of galvanized iron or other appropriate sheet metal and is removably arranged on the tank 1, the said top or crown member 2 being preferably provided at its end with flanges $2^x$ designed to cooperate with and engage the flanges $1^a$ and $1^b$ of the tank 1, as appears in Figure 2. The said top 2 includes a horizontal central portion 16 in which is an aperture $17^x$ that receives the tubular casing 7 fixed in the tank.

The top or crown member also includes inclined end portions 17 which carry the flanges before alluded to, and inclined side portions 18, the side portions being of a less width than the end portions in order to afford spaces in which poultry may place their heads incident to drinking from the fountain. Both the end portions and the side portions of the top or crown member 2 are provided with upstanding barbs 19, said barbs being preferably struck from the middle of said portions and being designed to discourage poultry from jumping or perching on the said inclined portion of the top or crown member.

It will be apparent from the foregoing that the top or crown member 2 may be readily removed from the tank 1 for the use of the said tank 1 as a simple drinking pan in the summer time when it is not necessary of course to heat the water placed in the pan. This will be better understood when it is stated that the crown member flanges $2^x$ are merely bent into engagement with the tank flanges $1^a$ and $1^b$.

The water in the tank 1 is designated by 20, and disposed in the tank 1 and about the tubular casing 7 and floatable on the water designated by 20 is a float 21 preferably of cork, although within the purview of my invention the said float may be made of any other material consonant with its purpose. The said float 21 is provided with two series of apertures designated by 22, each series of apertures 22 being in coincidence with the before mentioned spaces at the sides of the side inclined portions of the top or crown member 2. One of the series of said apertures 22 is clearly shown in plan in Figure 3. From this it follows that chickens or other poultry may conveniently insert their bills through the openings 22 in order to take water.

It will be appreciated however in this connection that the float 21 will always rest on the surface of the body of water 20 and consequently there will be no liability of roosters or other poultry getting water or moisture on their wattles and consequently there will be no liability of the roosters or other chickens becoming sick due to the freezing of water on their wattles.

Like the top or crown member 2, and the heating means, electrical heating elements, lamp or the like, the float 21 is readily removable from the tank 1 so that the said tank 1 may be employed in the summer time as a simple drinking pan.

It will be apparent from the foregoing that when the heating means employed in the tubular casing 7 is in operation, heat will be radiated from the said casing 7 and may be depended upon to prevent freezing of the water in the tank and to maintain the water in a heated state notwithstanding low temperatures so that the water will always be in a proper state for drinking purposes.

It will also be appreciated that my novel fountain is exceedingly simple and inexpensive in construction and, as a whole, is well adapted to withstand the usage to which poultry drinking fountains are ordinarily subjected, and it will further be noted that the fountain is adapted for winter and summer use, and that when employed in the winter time the poultry may conveniently drink without liability of their wattles becoming wet.

The float 21 is adapted to operate efficiently for the purpose indicated irrespective of the stage of the water in the tank 1, and in addition to the purpose hereinbefore ascribed to the float 21, said float 21, particularly when made of cork, will serve to retain heat in the body of water as is desirable.

Manifestly after use of the tank in the summer time as a simple drinking pan, the said tank 1 may as the wintertime approaches be quickly and easily equipped with the float 21, the top or crown member 2, and the heating means in the tubular casing 7, the said heating means within the purview of my invention being either an electric heating element, a coal oil lamp or any other heating means consonant with the purpose of my invention.

I have entered into a detailed description of the construction and relative arrangement of the parts embraced in the present and preferred embodiment of my invention, in order to impart a full, clear, and exact understanding of the said embodiments. I do not desire, however, to be understood as limiting myself to the precise construction disclosed, my invention being defined by my appended claims within the scope of which modifications may be made without departure from my invention.

Having thus described the invention, what I claim as new is:—

1. A drinking fountain for poultry comprising a tank having a bottom and side walls and also having flanges on opposite side walls, a tubular casing fixed in the central portion of the tank and open at its upper end and also open at its lower end and having at the latter end an annular flange, said tubular casing being adapted to receive heating means, a float arranged in the tank and about the tubular casing and movable vertically on water placed in the tank and having adjacent its opposite edges sets of spaced openings for the passage of the bills of poultry, and a top removably arranged on the tank and about the tubular casing and detachably engaged with said flanges of the tank and having inclined end portions and narrow inclined side portions, the latter to afford spaces above the openings in the float and further having upstanding barbs on its end portions and comparatively narrow side portions.

2. A drinking fountain for poultry, comprising a tank, a central casing carried in the tank and extending upright from the bottom of the tank, a top mounted on the tank and about the said tubular casing and having inclined side portions and inclined end portions, said side portions spaced from the opposite walls of the tank, and a float arranged in the tank and movable vertically and about the tubular casing and having sets of spaced vertical apertures in vertical alinement with the said spaces between the side portions of the top and the opposite walls of the tank.

In testimony whereof I affix my signature.

EUGENE B. CHISHOLM.